March 21, 1933.    P. F. BESSY    1,902,610
WINDSHIELD WIPER
Filed July 6, 1931    3 Sheets-Sheet 1
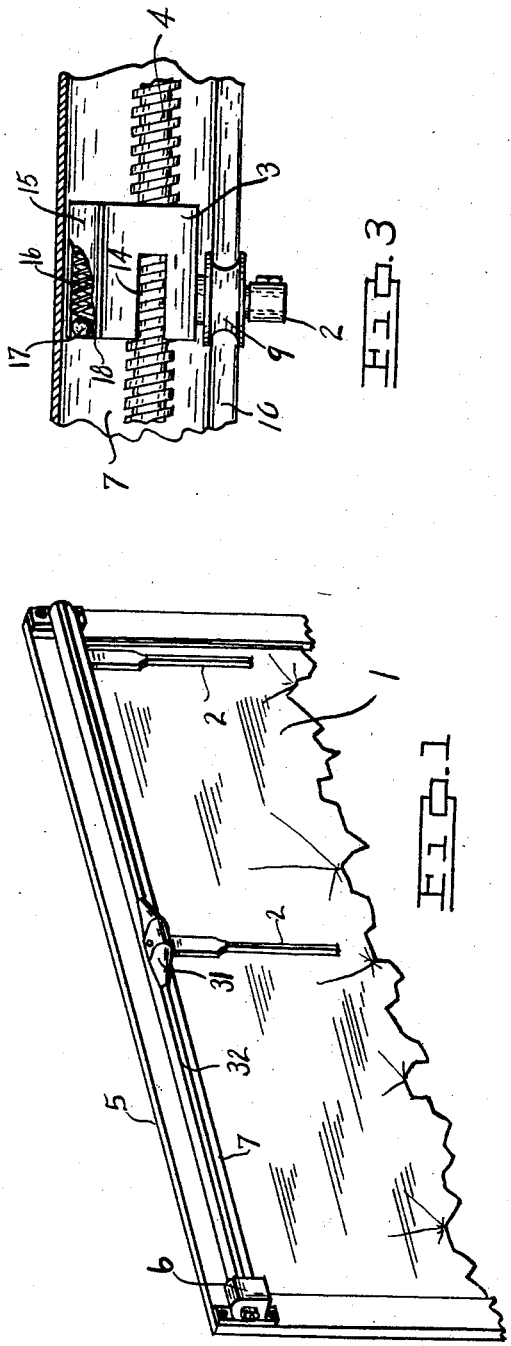
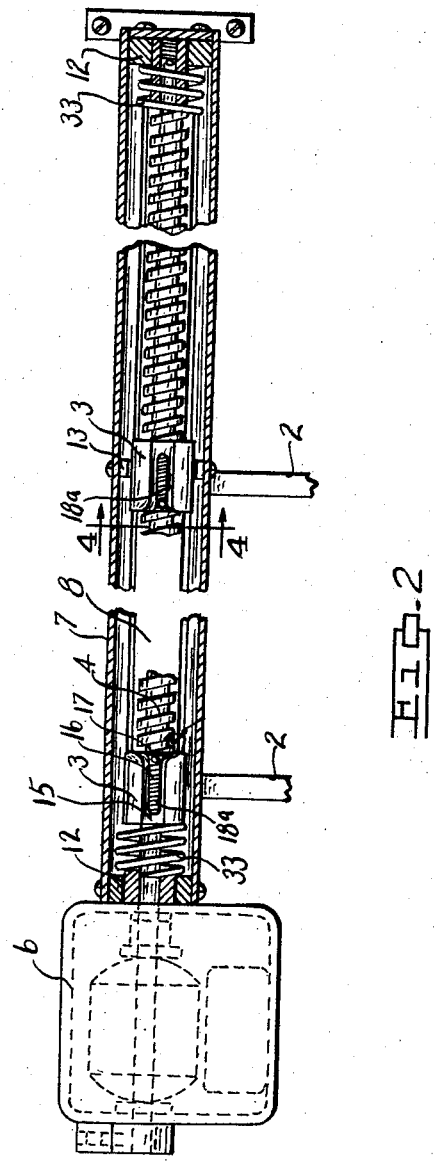
INVENTOR.
Peter F. Bessy
BY
J. S. Murray
ATTORNEY.

March 21, 1933. P. F. BESSY 1,902,610
WINDSHIELD WIPER
Filed July 6, 1931 3 Sheets-Sheet 2
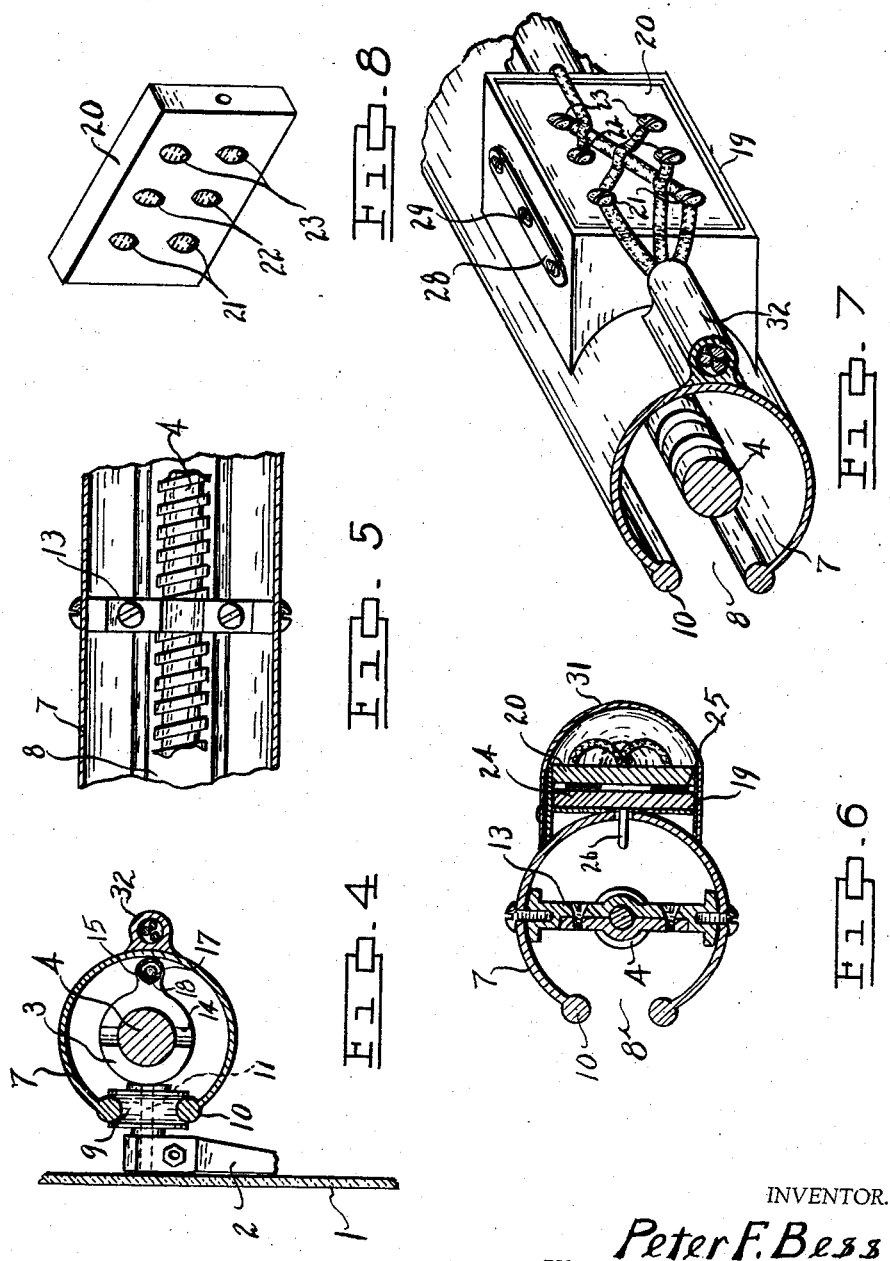
INVENTOR.
Peter F. Bessy
BY
ATTORNEY.

March 21, 1933.   P. F. BESSY   1,902,610
WINDSHIELD WIPER
Filed July 6, 1931   3 Sheets-Sheet 3
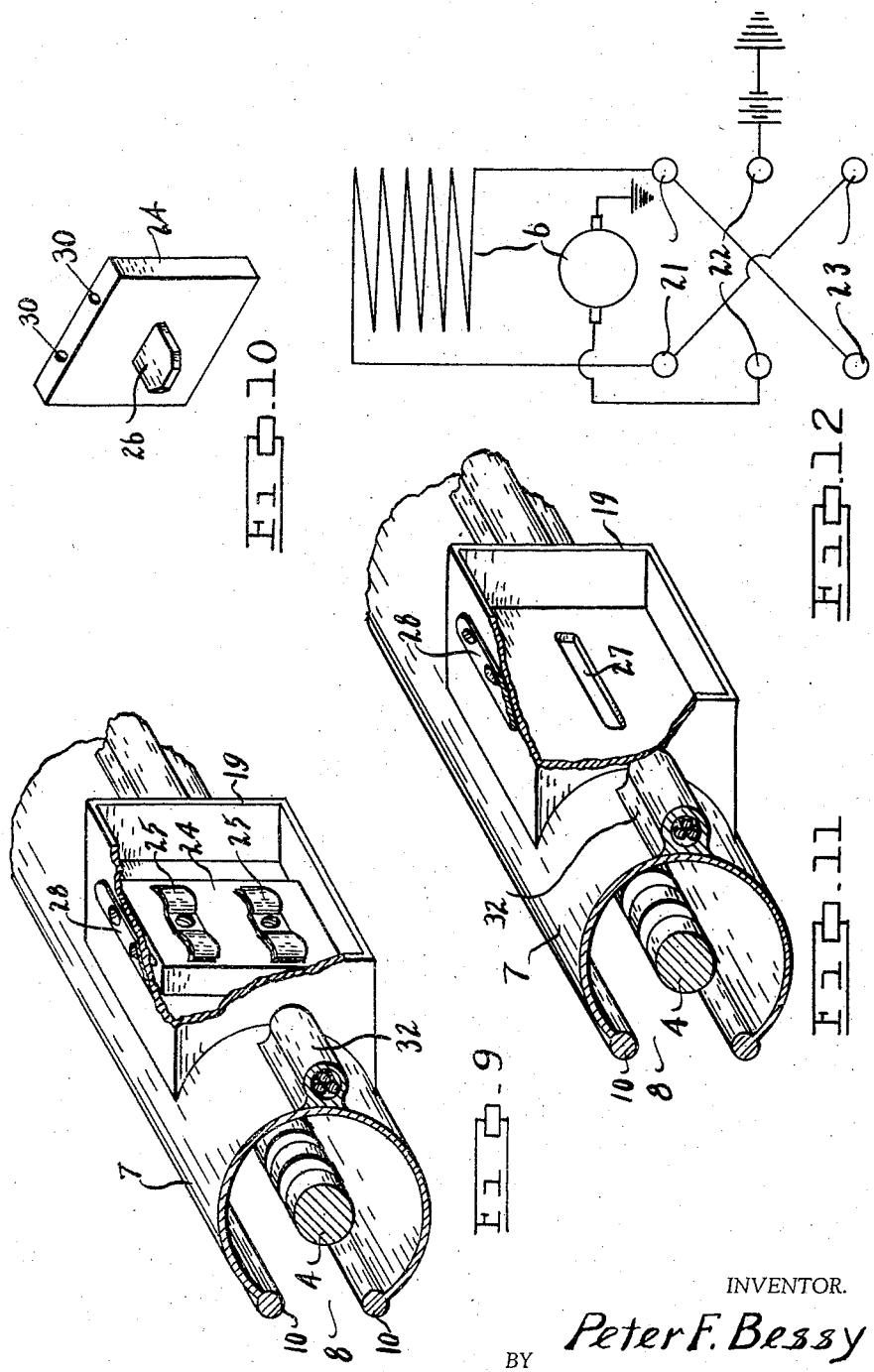
INVENTOR.
Peter F. Bessy
BY
J. S. Murray
ATTORNEY.

Patented Mar. 21, 1933

1,902,610

UNITED STATES PATENT OFFICE

PETER F. BESSY, OF DETROIT, MICHIGAN

WINDSHIELD WIPER

Application filed July 6, 1931. Serial No. 548,919.

This invention relates to windshield wipers, and particularly mechanisms for reciprocating a pair of wipers in unison across a windshield, each traversing substantially one-half of the glass.

It has been found desirable to operate a tandem windshield wiper of the described type from an electric motor-driven threaded shaft mounting a pair of nuts to which the wiper arms are attached, and it has further been found desirable to support said shaft approximately mid-way of its length by a suitable bearing.

An object of the invention is to so form each of said nuts that they may alternately assume limiting positions in which they sufficiently enclose said bearing, to permit each wiper arm to closely approach the area traversed by the other wiper arm.

Another object is to provide an improved mounting for a reversing switch exercising control of the shaft-driving motor, and an improved mechanism, whereby said nuts, in alternately approaching said bearing, may actuate said switch to reverse the motor.

A further object is to enclose said threaded shaft in an elongated slotted casing, and to provide improved means on each nut engaging in the casing slot to guide the nuts in their reciprocation.

These and various other objects the invention attains by the construction hereinafter described, and illustrated in the accompanying drawings, wherein:

Fig. 1 is a perspective view showing the front of a windshield having installed on its frame the herein described wiper.

Fig. 2 is a longitudinal vertical, sectional view of said wiper.

Fig. 3 is a fragmentary top plan view, showing one of said nuts and associated parts.

Fig. 4 is a transverse, vertical, sectional view of the threaded shaft and its casing, taken on the line 4—4 of Fig. 2, showing one of said nuts and associated parts in end elevation.

Fig. 5 is a fragmentary enlargement of a portion of Fig. 2, showing in greater detail the bearing which mounts the mid portion of the threaded shaft.

Fig. 6 is a transverse, vertical, sectional view of the wiper, taken through the central screw shaft bearing, and showing particularly said center bearing and a switch mechanism carried by the tubular casing.

Fig. 7 is a fragmentary, perspective view showing a reversing switch mounted on the tubular casing, the cover member for said switch being omitted.

Fig. 8 is a perspective view showing the rear face of a plate carrying the terminals of said switch, showing contact buttons on its rear face.

Fig. 9 is a fragmentary, perspective view similar to Fig. 7, but showing certain parts of the switch broken away to disclose a slide plate carrying contacts for bridging the buttons shown in Fig. 8.

Fig. 10 is a perspective view showing the rear face of said slide plate.

Fig. 11 is a perspective view of the switch casing, with the switch elements removed therefrom, and particularly disclosing a slot opening from said casing into the tubular casing of the shaft.

Fig. 12 is a diagram of the reversing switch, motor and circuit thereof.

In these views, the reference character 1 designates a windshield or any other transparent member to which a wiper mechanism is applicable. A pair of wiper arms 2 are reciprocable in unison across the front face of said windshield, being so spaced as to individually traverse the areas between the vertical center line of the windshield and its lateral margins. Each wiper arm is carried at its upper end by a nut 3, threaded upon a screw shaft 4. The latter extends across the top of the windshield frame 5 and is suitably terminally mounted on the latter, being driven by an electric motor 6, also carried by said frame. It is preferred to enclose said shaft within an elongated tubular casing 7, which protects the shaft and nuts from the weather and further guides the nuts and restrains them from turning.

Thus said casing is formed, from end to end thereof, with a slot 8 opening toward the windshield, and each nut 3 rotatively carries a roller 9 fitting in said slot and grooved to engage its margins. Preferably said margins are formed with enlargements or beads 10 shaped and proportioned to fit the grooves of said rollers. As illustrated, a pin 11 rigidly projects from each nut through the slot 8, terminally mounting one of the wiper arms 2 and intermediately mounting one of the rollers 9 (see Figs. 3 and 4).

The shaft 4 is journaled at its ends in disk bearings 12 snugly fitted in the casing extremities, and an additional bearing member 13 engages the shaft substantially midway of its length. The member 13 is of an approximate I-shape, in cross-section, having web portions above and below the shaft (see Fig. 6), which may enter slots 14 in the nuts 3 when the latter are at the inner limits of their reciprocation. The slots 14 are vertically diametrical to the nuts, extending from the inner ends thereof approximately half the length of the nuts. Thus the nuts are adapted to straddle the bearing 13, and the wiper arms are adapted to each closely approach the vertical center line of the glass, so as to merge the two areas cleaned by said wipers. To facilitate assembly, it is preferred to make the bearing member 13 in two separable parts meeting diametrically of the shaft, as best appears in Fig. 6.

Each nut 3 is further formed upon its front face with a rib 15 extending from end to end of said nut and formed with a socket opening in the inner end of said rib. Within said socket of each nut is mounted a coiled spring 16 urging a ball 17 toward the open end of the socket. A pin 18 or the like obstructs the open end of each socket to prevent escape of the ball, while permitting its retraction against the spring. From the inner end of the rib 15, a slot 18a opening forwardly from said socket, extends to a point adjacent the closed outer end of the socket. It will presently appear that the spring-pressed ball 17 constitutes an actuator for a reversing switch exercising control of the motor 6.

Said reversing switch is carried by a sheet metal housing 19 secured to the front of the casing 7, midway of its length. In the front portion of said housing is fitted an insulating plate 20 carrying three pairs of terminals 21, 22, and 23. These are connected to the motor and a source of current, as is common in reversing switches, the connections being best shown in Fig. 12.

Rearwardly of the plate 20, a smaller insulating plate 24 is mounted in the housing 19 and is adapted to undergo a limited sliding travel lengthwise of the casing 7. Upon its front face, the plate 24 carries a pair of spring contacts 25 which in the respective limiting positions of said plate, bridge across the terminals 21 and 22, and across the terminals 22 and 23.

For yieldably holding the plate 24 in either of its limiting positions, a leaf spring detent member 28 is exteriorly mounted upon the housing 19 and carries, midway of its length, a hemispherical keeper 29 projecting freely into the housing 19 through a suitable opening in the latter. The plate 24 is formed in one of its edge faces with two shallow sockets 30, and the keeper 29 is adapted to snap into one or the other of said sockets, according as said plate assumes one or the other of its limiting positions.

For actuating the plate 24 in its sliding travel, a switch element formed by a metal lug 26 is rigidly and centrally carried by said plate upon its rear face and projects freely through a slot 27 longitudinally formed in the casing 7. Said lug is closely adjacent to the bearing 13 and is so located, that, as each nut 3 approaches its inner limiting position, the ball 17 carried by said nut engages said lug and is thus retracted in its socket, compressing the associated spring 16. Upon a predetermined compression of said spring, its expansive force overcomes restraint exercised by the detent 28, 29, and the plate 24 is shifted from one to the other of its limiting positions. Thus the contacts 25 are shifted in related to the terminals 21, 22, and 23 to reverse the motor and change the direction of reciprocation of the nuts and wiper arms.

The switch housing 19 is preferably equipped with a suitable removable cover member 31, and a conduit 32 may be carried by the casing 7 to enclose the electrical connections leading to and from the switch.

Preferably springs 33 are coiled upon the end portions of the shaft 4 to retard and cushion travel of the nuts and wiper arms, as they approach their outer limiting positions.

From the foregoing description, it will appear that when the motor 6 is energized, the nuts 3 and wiper arms 2 will reciprocate in unison across the windshield, said arms traversing areas at opposite sides of the vertical median line of the shield. In the alternate approach of the nuts to said median line, the reversing switch is actuated, to reverse the direction of travel of the nuts and wiper arms.

By centrally mounting the reversing switch on the casing 7, each nut is permitted to directly approach and operate said switch in reaching the inner limit of its stroke, and a desirable simplicity of control over the switch is achieved.

The rollers 9 minimize friction in guiding the nuts and resisting turning thereof about the shaft axis.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. In a windshield wiper, the combination with a windshield, of a pair of wiper arms reciprocatory respectively between the median vertical line of said shield and its lateral margins, a threaded shaft extending across said shield, an electric motor driving said shaft, a pair of nuts threaded upon and reciprocatory by said shaft respectively at each side of the vertical median line of the shield, means attaching each of said wiper arms to one of said nuts, a reversing switch controlling said motor, positioned adjacent to the mid portion of said shaft, and comprising a single control element directly projecting from such switch substantially toward said shaft, and means carried by each of said nuts engageable with said control element in substantially identical inner limiting positions of said nuts to reverse the motor.

2. In a windshield wiper, the combination with a windshield, of a pair of wiper arms acting upon said windshield and respectively reciprocatory between the vertical median line of the windshield and its lateral margins, a screw threaded shaft extending across the windshield, a motor driving said shaft, a pair of nuts threaded upon and reciprocatory by said shaft one at each side of its center, an elongated, longitudinally slotted casing enclosing said shaft and nuts, means extended through the slot of said casing attaching each of said wiper arms to one of said nuts, a reversing switch carried by said casing, substantially midway of the casing length and having a single control element directly projecting from the switch within the casing into the path of both of said nuts, and means carried by each of said nuts engageable with said control element in substantially identical inner limiting positions of said nuts to reverse the motor.

3. In a windshield wiper, the combination with a windshield, of a pair of wiper arms acting upon the windshield, and respectively reciprocatory between the vertical median line of the windshield and its lateral margins, members engaged by the upper ends of each of said wiper arms, mechanism for reciprocating said members, an electric motor driving said mechanism, a reversing switch having a single control element projecting directly from the switch into the path of both of said reciprocating members, and means carried by each of said reciprocatory members engageable with said control element in substantially identical inner limiting positions of said members to reverse the motor.

4. In a windshield wiper, a screw threaded shaft, a nut on said shaft having a socket elongated in parallelism with its axis, a wiper arm carried by said nut, an electric motor driving said shaft, a reversing switch mounted adjacent to said shaft and comprising a motor-reversing member slidable lengthwise of said shaft, an actuator for said switch carried by said nut in the socket thereof, a lug carried by said slidable member projecting substantially toward said shaft in the path of said actuator, a wall of said socket being slotted to afford engagement of said lug with said actuator, a spring in said socket resisting retraction of said actuator, and means yieldably resisting sliding travel of said sliding switch member, said yielding means being overcome through compression of said spring upon a predetermined retraction of said actuator when the latter is engaged by said lug.

5. In a windshield wiper, a screw threaded shaft, a nut on said shaft having a socket elongated in parallelism with its axis, a wiper arm carried by said nut, an electric motor driving said shaft, a reversing switch mounted adjacent to said shaft and comprising a motor-reversing member slidable lengthwise of said shaft, an actuator for said switch carried by said nut in the socket thereof, a lug carried by said slidable member projecting substantially toward said shaft in the path of said actuator, a spring in said socket resisting retraction of said actuator, and means yieldably resisting sliding travel of said sliding switch member, said yielding means being overcome through compression of said spring upon a predetermined retraction of said actuator when the latter is engaged by said lug.

6. In a windshield wiper, a longitudinally slotted tubular casing, a threaded shaft, journaled in said casing longitudinally thereof and having its mid portion annularly grooved to form a journal, a bearing engaging said journal and of lesser thickness than the diameter of said shaft, and having diametrical web portions mounting it within and upon said casing, a pair of nuts threaded on said shaft one at each side of said bearing, a pair of wiper members each carried by one of said nuts and engaging the latter through the slot of said casing, said nuts having diametrical slots across their opposed ends proportioned to accommodate said web portions whereby said nuts may assume substantially identical positions straddling said bearing, and means for rotating said shaft.

In testimony whereof I sign this specification.

PETER F. BESSY.